June 2, 1970 E. D. SPRAKER 3,515,806

PORTABLE INPUT-OUTPUT TERMINAL

Filed Sept. 16, 1968 6 Sheets-Sheet 1

INVENTOR:
EARL D. SPRAKER
Richards Harris & Hubbard
ATTORNEY

June 2, 1970 E. D. SPRAKER 3,515,806

PORTABLE INPUT-OUTPUT TERMINAL

Filed Sept. 16, 1968 6 Sheets-Sheet 2

June 2, 1970 E. D. SPRAKER 3,515,806

PORTABLE INPUT-OUTPUT TERMINAL

Filed Sept. 16, 1968 6 Sheets-Sheet 3

PORTABLE INPUT-OUTPUT TERMINAL

Filed Sept. 16, 1968 6 Sheets-Sheet 6

United States Patent Office 3,515,806
Patented June 2, 1970

3,515,806

PORTABLE INPUT-OUTPUT TERMINAL

Earl D. Spraker, Dallas, Tex., assignor to Electronic Data Systems Corporation, Dallas, Tex.

Filed Sept. 16, 1968, Ser. No. 773,680
Int. Cl. H04m *11/00*
U.S. Cl. 179—2 7 Claims

ABSTRACT OF THE DISCLOSURE

A pushbutton tone generator having a housing to receive the handpiece of conventional, dial-type telephones for converting same by means of audio-coupling to a tone. transmitting station with automatic call and identification means and selectable data encoding means.

This invention relates to a tone generator system which produces and transmits coded tone signals over conventional telephone transmission lines without the necessity of expensive conversion equipment and without physical connection to such lines with means for control of the coding of such signals.

This application is a continuation-in-part of application Ser. No. 715,389, filed Mar. 22, 1968, now abandoned.

Transmission of intelligence over telephone lines via tone signals is known and is widely used. Manufacturers of telephone equipment and computers both have contributed to the development of such data transmission practices.

It is known to utilize an array of pushbuttons for actuating tone generators for data transmission systems. Although convenient, telephone sets with suitable modifications are expensive. They are limited in data they can transmit and are further limited because they must remain at a fixed location, being physically connected to a telephone transmission line. Further, such an arrangement may be incompatible for use with the more prevalent rotary-dial type telephones.

The majority of telephones now in use are of this rotary-dial type and will continue to be in the future, with complete conversion to pushbutton dialing systems possibly never to be achieved.

It has been found that automatic pre-programmed, programmable call sequences of voice tone signals and identification of the caller by such sequences are highly desirable.

This invention provides for operation over standard telephones, including the rotary-dial type, by means of tone intelligence transmission. In accordance with the invention, a separate housing is provided with tone generators actuated independently of a telephone unit and capable of transmitting data to and from the handpiece of a conventional telephone. The unit is portable, and may include a coding unit for automatically identifying, to a computer system, the transmitting unit used. This will simplify for the user establishing identification and also may provide a high degree of security. The identification may be pre-set for each unit as to be selectively alterable or non-alterable by the user. If such a set or coding unit is lost or stolen, a computer used with the system may then be programmed to prevent access thereto by means of the missing unit. The coding unit can also be used as a carrier of information to determine the type of data to which the computer should respond. For example, some users may not be authorized to have access to certain data such as personal financial information and the like while others may have such authorization.

In a further aspect of the invention, a touch-tone call and access system is provided with a plurality of tone generators having an array of actuators accessible to an operator to initiate generation of selectable coded combinations of voice tone signals. A sequencer is provided for automatically generating a sequence of such combinations wherein at least one tone is employed other than those tones produced in response to the operator accessible actuators. The system further provides a single actuator accessible to the operator for energizing the system for the automatic sequence generation.

These and other features of the invention will become more apparent to those skilled in the art by reference to the following detailed description taken in conjunction with the accompanying drawings, in which.

Figure 3:
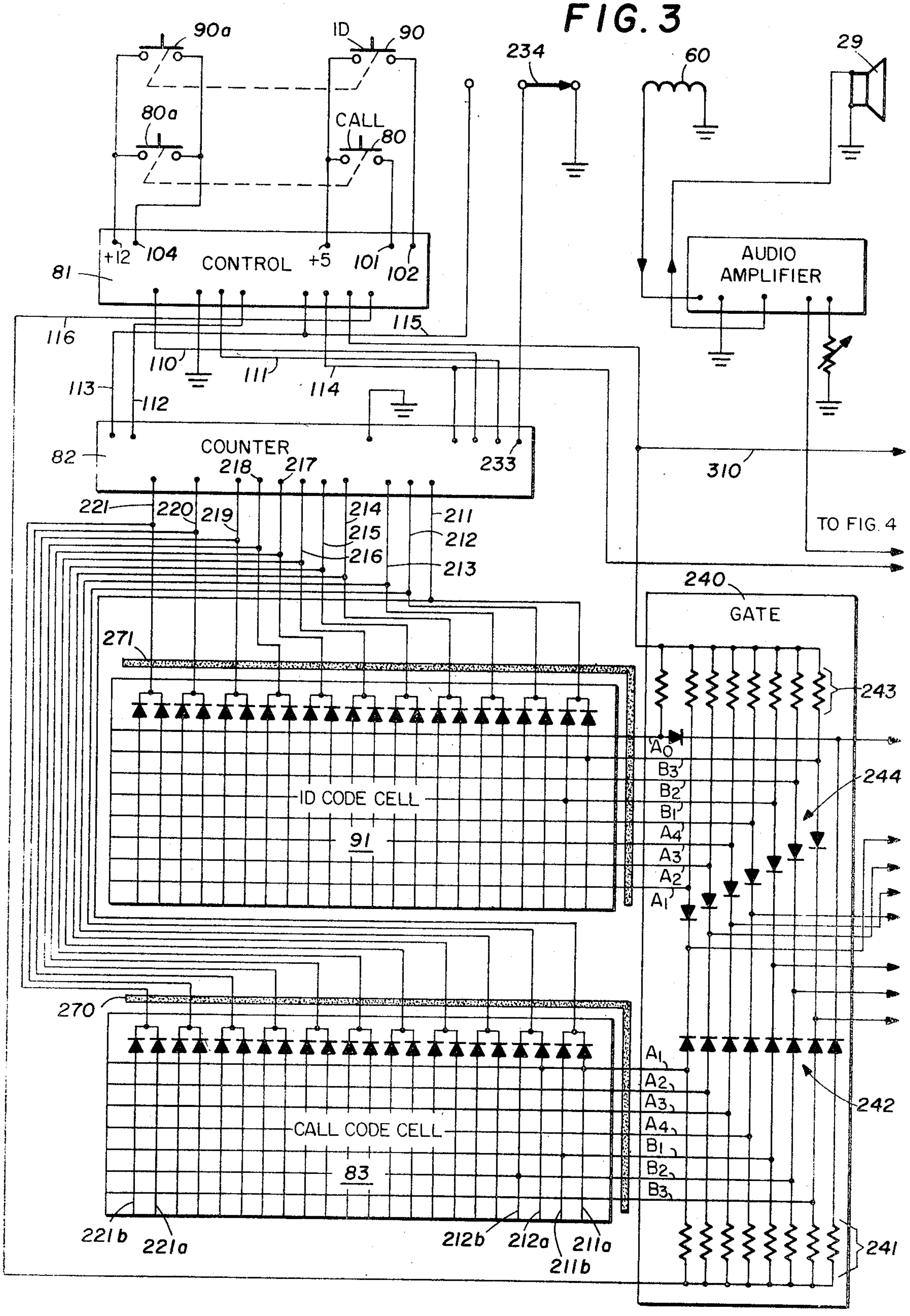
Figure 4:
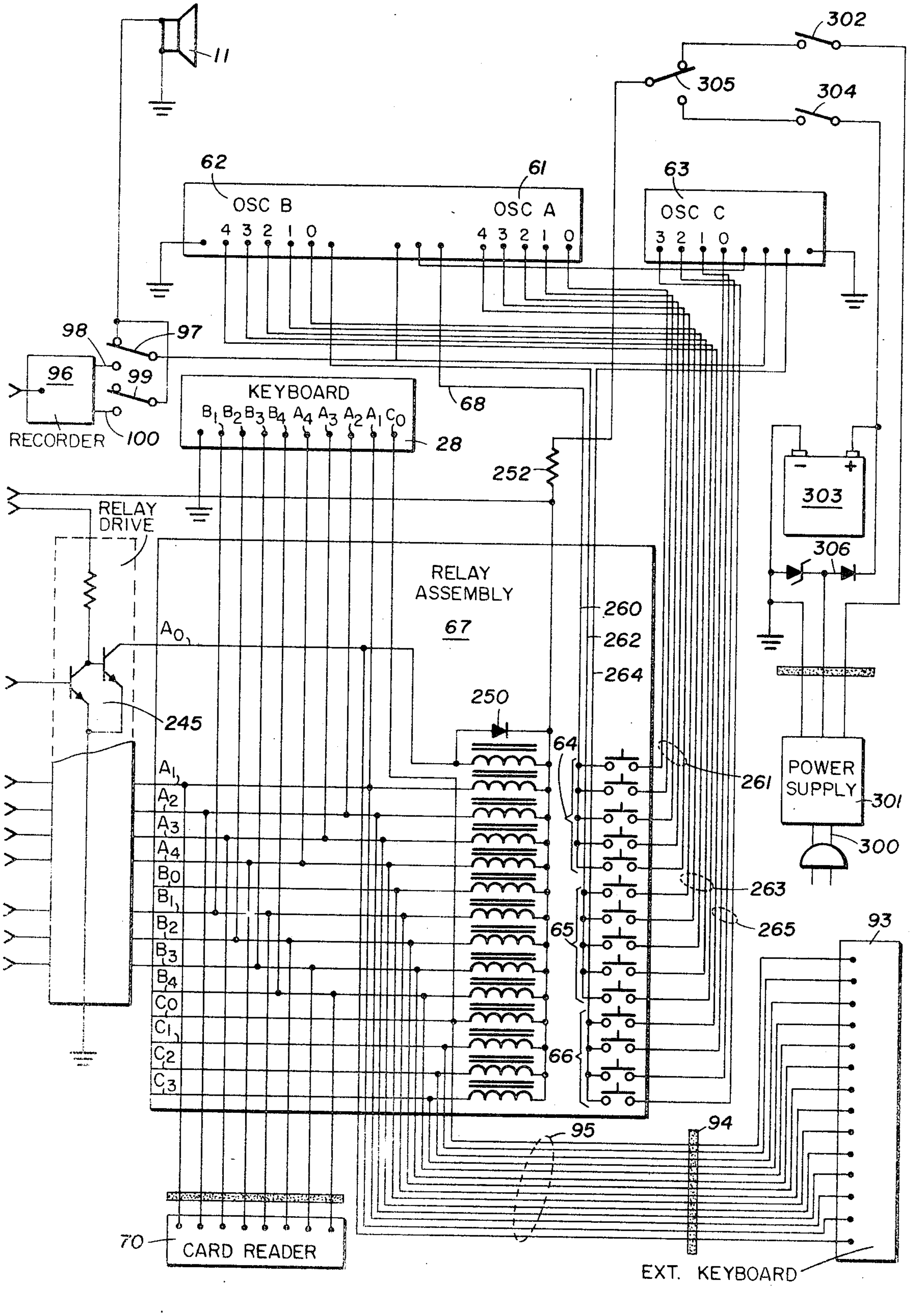
Figure 5:
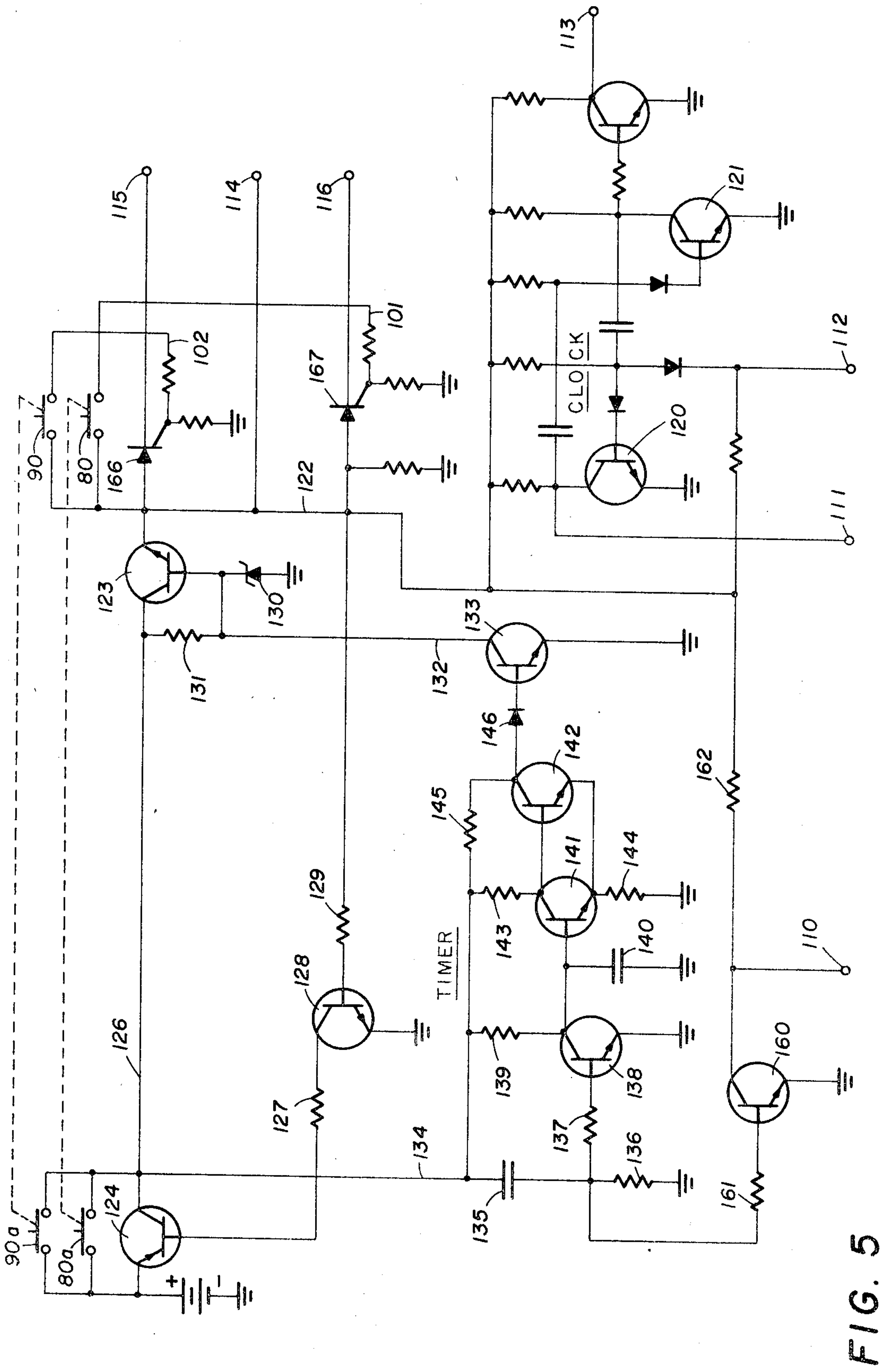
Figure 6:
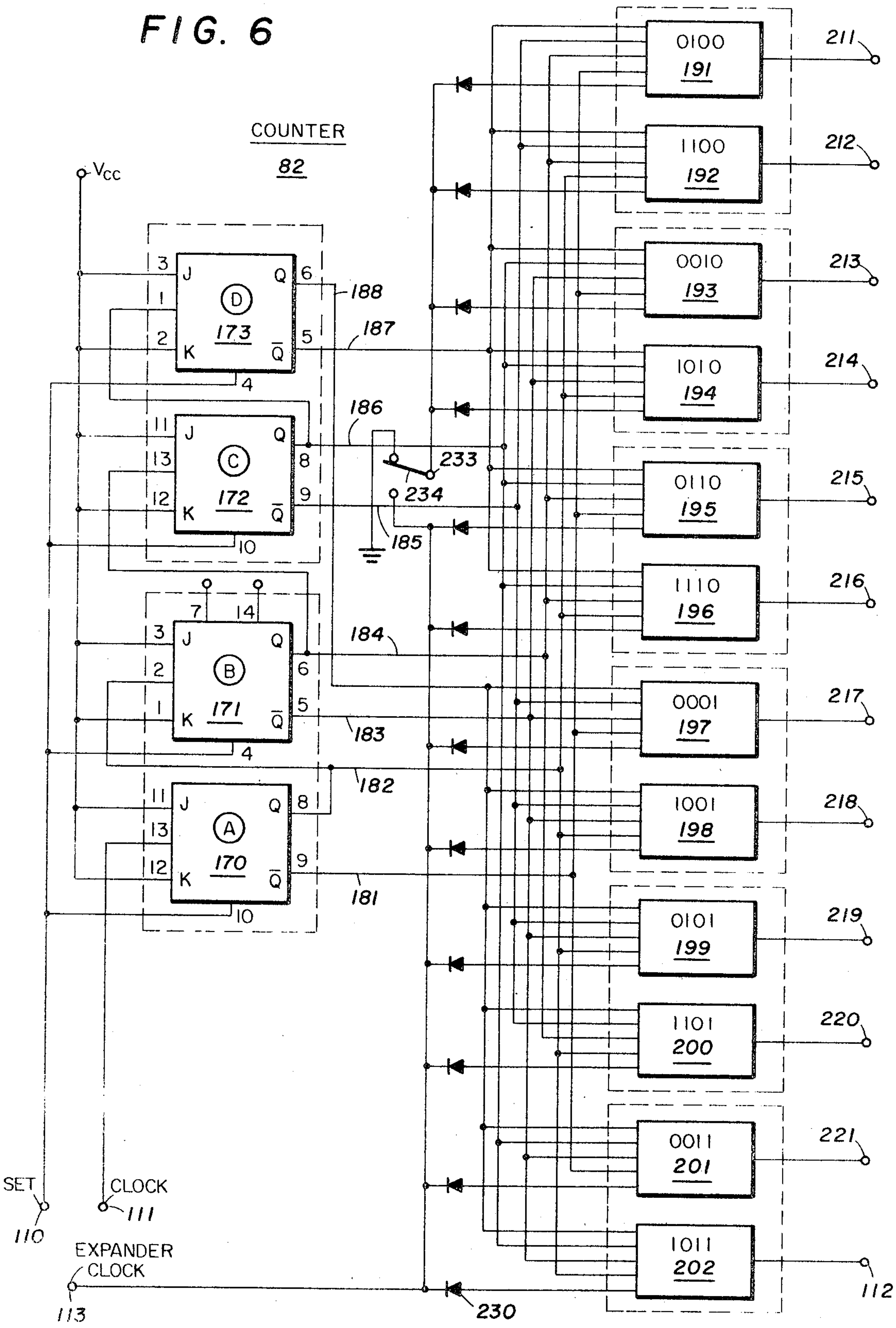
Figure 7:
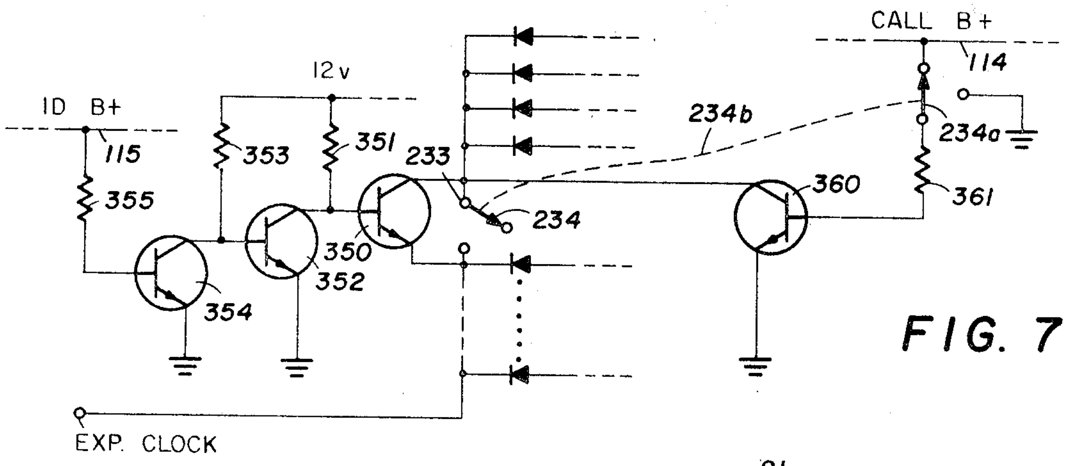

FIGS. 3 and 4 comprise a system layout in schematic block form;

FIG. 5 is a detailed diagram of the control unit of FIG. 3;

FIG. 6 is a detailed diagram of the counter unit of FIG. 3;

FIG. 7 illustrates a preferred modification of the means for selection of local or long distance mode; and FIGS. 8–11 illustrate the identification and call cell construction.

Referring now to the drawings wherein like numerals indicate like parts, the numeral 10 indicates a conventional telephone having a rotary dialing mechanism 12. The mouthpiece 14 and earpiece 15 are formed in the handset 13. A cord 16 connects the handset to the housing.

A portable casing or housing 18 is provided, in accordance with this invention with an upper surface 19 in which two receptacles 20 and 22 are formed. The receptacle 20 is adapted to receive the earphone 15 and the receptacle 22 is adapted to receive the mouthpiece 14. A switch 24 provides for energizing the unit.

The casing 18 has a front console surface 26 in which a keyboard panel 28 is mounted along with a speaker 29, and a volume control 30. The panel 28 includes an array of selector buttons 33.

Figure 2:
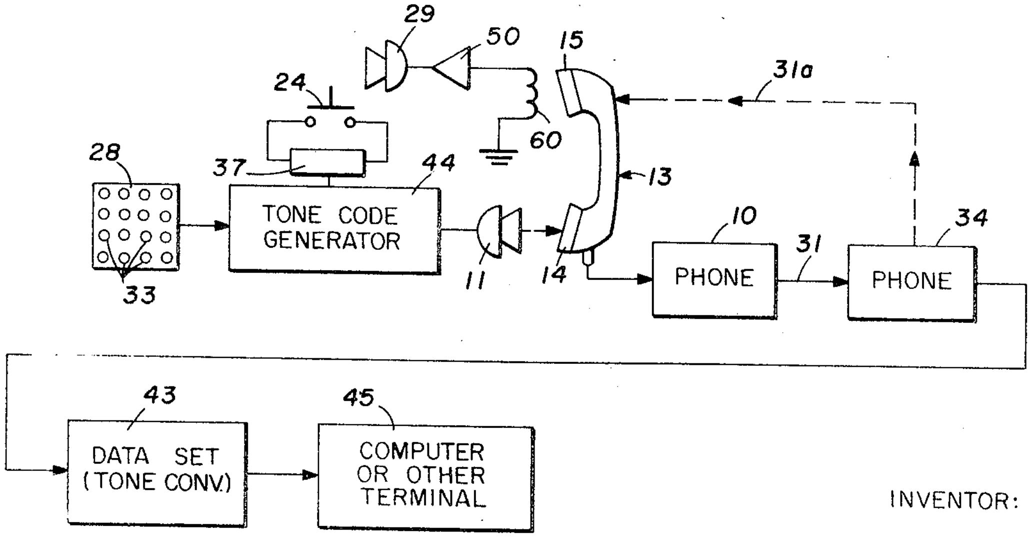
FIG. 2 is a more complete diagrammatic view showing several parts contained within the tone generator housing.

A telephone line 31 connects the instrument 10 to a receiver 34. The receiver 34 is connected to a tone converter 43. A control device 37, FIG. 2, is programmed to control a generator 44 to generate and transmit a sequence of identification tone signals following closure of switch 24. Data from the tone converter 43 is fed to a computer 45. Other data terminal devices of known types may also be used.

Referring again to FIG. 2, the keyboard 28 is also connected to the tone generator 44. The tone generator will be described more fully hereinafter. Recognizable, distinguishable tones are generated by depressing each of the buttons 33. The tones generated are fed to a speaker 11 whose output is sensed by the mouthpiece 14 for transmission to the data converter 43 and the computer 45.

In operation, the handset is first placed on unit 18. The switch 24 is closed to energize unit. An ID switch 90 is then actuated to cause tone generators to produce a series of tones uniquely identifying this set. The user may then depress one or more of the buttons (0–9) on panel 28 and then button EOB or button EOT to command a given action. The tone generators produce a tone combination code which is reproduced in speaker 11. Since the speaker 11 is directly below the mouthpiece 14, tones are delivered to the set 10 which are transmitted to the remote receiver set 34. The receiver telephone is connected to a tone re-converter apparatus which can be of a type currently marketed by Western Electric under a Model 403A. With such a converter, the frequency (tone) data is changed into DC impulses readable by the computer. In practice, an IBM 7770 voice answer back-audio response unit has been found to be suitable for these purposes.

Figure 1:
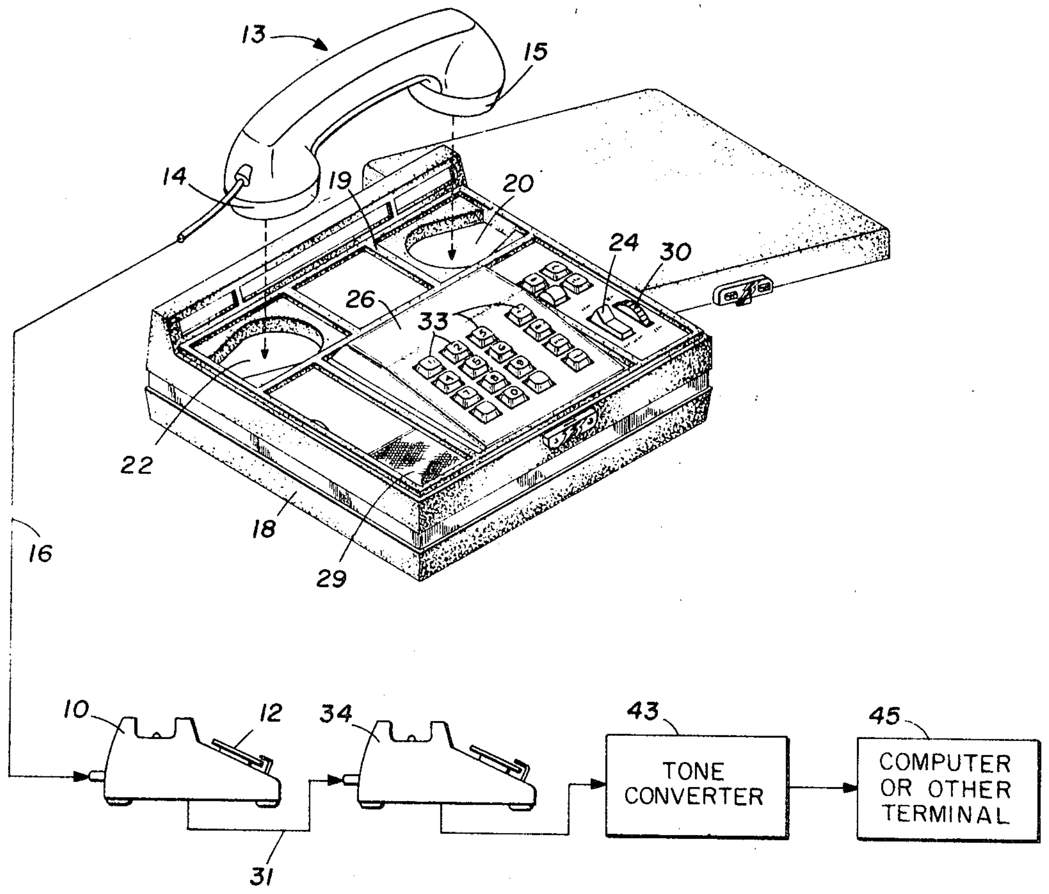
FIG. 1 is a diagrammatic perspective view of a system embodying the invention.

The apparatus shown in FIGS. 1 and 2 can also serve as an output terminal by sensing voice frequency signals which energize the earpiece 15. As indicated by the dotted lines 31*a*, FIG. 2, the incoming audio frequency signals are detected by an induction coil 60. The signals are amplified in amplifier 50 and reproduced through the speaker 29 of the housing 18. As is known, apparatus such as the above-mentioned IBM 7770 simulates the voice, thereby enabling the computer to talk to the unit 10. Such communication is conveniently amplified to a level suitable for recording or for listening by ear.

FIGURES 3 AND 4

In FIGS. 3 and 4, the system has been shown in further detail. As shown in FIGS. 3 and 4, the system relates primarily to control an operation of the tone generator 44 of FIG. 2 as information exchanges are carried out by way of the speaker 11 and the operation of the sensing coil 60 which energizes the amplifier 50 to actuate speaker 29.

This system provides for generating pre-programmable sequences of voice frequency tones that can be transmitted by way of speaker 11 to the telephone handset. It further provides coded cells that may be of the plug-in type whereby any terminal can be provided with call cells which in response to an actuator will first produce the necessary sequence of coded tones to complete a connection from the terminal to a desired computer address. Thereafter an ID code cell will produce a second coded tone sequence which will identify the terminal and provide a necessary interlock or enabling condition to be established for accessing an account with which said terminal is associated. Thus, there is provided for automatic dialing of a subscriber and then identification of the caller in order to access a given account.

The system includes three multi-output oscillators 61, 62 and 63. In this embodiment each of oscillators 61 and 62 may provide five distinct output tones. Oscillator 63 in this embodiment may provide four output tones. The frequency of the tones may be as set out below; although this selection is not necessarily limiting:

As is understood, common carriers divide the normal voice grade signals into three sub-channels, each approximately 400 cycles wide. A code may then require a tone in each of the channels. For example, the tone frequencies on A, B and C channels may be as follows:

TABLE I

| | Cycles |
|---|---|
| A Channel: | |
| **A0** | 600 |
| **A1** | 697 |
| **A2** | 770 |
| **A3** | 852 |
| **A4** | 941 |
| B Channel: | |
| **B0** | 1,098 |
| **B1** | 1,209 |
| **B2** | 1,336 |
| **B3** | 1,477 |
| **B4** | 1,633 |
| C Channel: | |
| **C0** | 1,950 |
| **C1** | 2,050 |
| **C2** | 2,150 |
| **C3** | 2,250 |

In the "two out of eight" code only the A and B channels are utilized and the zero (0) frequencies are not used. Therefore, the matrix can be visualized as:

TABLE II

| | B Channel | | | |
|---|---|---|---|---|
| | B1 | B2 | B3 | B4 |
| A Channel: | | | | |
| A1 | 1 | 2 | 3 | A |
| A2 | 4 | 5 | 6 | B |
| A3 | 7 | 8 | 9 | C |
| A4 | EOB | 0 | EOT | D |

Thus, in the "two of eight" code, in order to transmit the numeral one (1), a 697 frequency or tone is sent over the A channel and a 1209 frequency or tone is sent over the B channel. To transmit a numeral nine (9), an 852 frequency or tone is generated on the A channel and a 1477 frequency or tone is placed on the B channel. By utilizing all combinations in which there must be one tone and one tone only on both the A and B channels, one can obtain the sixteen codes. Since there are a total of two tones (one on the A channel and one on the B channel) for each code out of a possibility of eight tones (four tones on the A channel and four tones on the B channel), this system of coding is known as the "two out of eight" code.

By fully utilizing a "three out of fourteen" code, at least ninety-nine valid characters and, therefore, ninety-nine tone combinations can be generated.

When all five tones on each of the A and B channels plus the four tones on the C channel are utilized, with the requirement that there be one tone on each channel, the coding technique is called a "three out of fourteen" code. Under this system, assume that to transmit the numeric digits shown in Table II there will be a C0 (1950 cycles) present on the C channel. When there is a C1 (2050 cycles) tone on the C channel, the code matrix is:

TABLE III

| | B Channel | | | |
|---|---|---|---|---|
| | B1 | B2 | B3 | B4 |
| A Channel: | | | | |
| A1 | / | S | T | * |
| A2 | U | V | W | * |
| A3 | X | Y | Z | * |
| A4 | * | * | * | * |

Thus, A1, B1, C1 transmission would be interpreted as a slash (/). To transmit the letter Y, tones A3, B2 and C1 would be generated on their respective channels.

The matrices for C2 and C3, respectively, would appear as:

TABLE IV

[(C2) 2,150 c.p.s.]

| | B Channel | | | |
|---|---|---|---|---|
| | B1 | B2 | B3 | B4 |
| A Channel: | | | | |
| A1 | J | K | L | * |
| A2 | M | N | O | * |
| A3 | P | Q | R | * |
| A4 | * | * | * | * |

TABLE V

[(C3) 2,250 c.p.s.]

| | B Channel | | | |
|---|---|---|---|---|
| | B1 | B2 | B3 | B4 |
| A Channel | A | B | C | * |
| | D | E | F | * |
| | G | H | I | * |

By combining all of such matrices along with the additional codes made available by using the combinations of A0 and B0, it will be seen that ninety-nine possible combinations are available when one and only one tone is generated on each of the three sub-channels. (A0, B0, C0 combinatitons is not used.)

The above coding discussion applies to the ABC Code used with touch tone equipment by major common carriers and computer and terminal equipment manufacturers.

In the present invention, the tone generation may be automatic or through the keyboard 28 as will now be described.

Three banks of reed switches 64, 65 and 66 are connected to control the oscillators 61, 62 and 63, respectively. The reed switches are each independently actuated by coils in a bank 67.

In one embodiment of the system, operations are such that only a two-tone code is used. In such case, the coils in bank 67 are selectively energized in a sequence of pairs so that a selected and pre-programmed sequence of pairs of tones will be applied by way of the output channel 68 leading to the output speaker 11. The control for generating the tone sequences may involve any one of four different inputs. The first input is the keyboard 28 which is a 4 x 4 array of touch tone actuators as shown in FIG. 2.

The second input is a card reader unit 70 which, by way of output channels 71, may selectively energize pairs of the coils in bank 67 in any sequence or combination dictated by data encoded on a card employed with the card reader 70.

The third input is a call switch 80 which when actuated initiates operation of a control unit 81, a counter 82, and a call code cell 83 automatically to energize successive pairs of coils in bank 67 in a predetermined sequence depending upon the configuration given to the circuits in the call code cell 83.

The fourth input is an identification switch 90 which when actuated initiates operation of control unit 81, counter 82 and an ID code cell 91 to energize successive pairs of the coils in bank 67 in a predetermined call sequence which depends upon the configuration of the circuits in the ID code cell 91.

An additional input is an external keyboard 93 which is capable of actuating the tone generators 61–63 for three tone coding. Keyboard 93 is coupled to the coil bank 67 by way of plug unit 94 and channels 95.

The system also provides for a time delay in the transmission from the unit of the data encoded by way of tone generation. This is accomplished by use of a system 96 which is capable of storing and phonographically reproducing the tone call sequence and ID tone sequence, as well as data dependent tone sequences which are to be transmitted over a given channel by way of speaker 11. The unit 96 preferably will be a tape recorder. It permits accumulation of data which is to be transmitted by way of speaker 11 at a time other than the time data enters the system. This is accomplished by providing a switch 97 which in its upper position connects the output of oscillators 61–63 directly with speaker 11. In its lower position it is connected to the input channel 98 of the recorder 96.

A second switch 99, in its lower position, transfers, by way of output channel 100, signals reproduced by recorder 96 and applies them to the speaker 11.

FIGURE 5

The operation of control unit 81 will now be considered and is illustrated in detail in FIG. 5. Control unit 81 may be actuated by either switches 80 or 90. The switch 80 is connected between the +5 volts terminal and a call terminal 101. The switch 90 is similarly connected, but extends to an ID terminal 102. The switch 90*a* is mechanically linked to switch 90. Switch 90*a* serves to connect a 12 volts supply to terminal 104 to energize control unit 81. Switch 80*a* is mechanically linked to switch 80 and similarly applies 12 volts to terminal 104.

Unit 81 is provided with connections including a set line 110, a clock line 111, a stop count line 112, an expander clock line 113, a 5 volts supply line 114, an ID gate line 115 and a call gate line 116.

The control unit of FIG. 5 includes an internal clock. The clock comprises a multi-vibrator in which two transistors 120 and 121 are connected in a conventional circuit arrangement. The supply voltage source 119 is connected to the emitter of a PNP transistor 124. Transistor 124 is in series with an NPN transistor 123 whose emitter is the B+ supply terminal for the clock.

The system is operated such that upon closure of the switch 80 or 90, a sequence of operations will be initiated wherein +5 volts is applied to the bus 122 for a period corresponding to 13 or 14 cycles of the clock.

More particularly, closure of either switch 80 or 90 exerts a control action on the transistor 124 turning transistor 124 on by reason of the +12 volts on its emitter. The collector of transistor 124 is connected to the collector of transistor 123 by way of line 126. The base of transistor 124 is connected by way of resistor 127 to the collector of transistor 128 whose emitter is connected to ground and whose base is connected by way of resistor 129 to the emitter of transistor 123. The base of transistor 123 is connected by way of a Zener diode 130 to ground. The collector of transistor 123 is connected, by way of resistor 131, to the base and by way of conductor 132 to the collector of a transistor 133. The emitter of transistor 133 is connected to ground.

The emitter of transistor 124 is connected by way of line 134, condenser 135 and resistor 136 to ground. The junction between condenser 135 and resistor 136 is connected by way of resistor 137 to the base of a transistor 138 whose emitter is connected to ground and whose collector is connected by way of resistor 139 to line 134.

The collector of transistor 138 is connected to the base of transistor 141 and, by way of condenser 140, to ground. The collector of transistor 141 is connected to the base of a transistor 142 and by way of resistance 143 to line 134. The emitters of transistors 141 and 142 are coupled together and are connected by way of resistor 144 to ground. The collector of transistor 142 is connected by way of resistor 145 to line 134 and, by way of resistor 146, to the base of transistor 133.

Operation of the portion of the circuit of FIG. 5 thus far described is as follows. When the transistor 124 is turned on, it initiates action in the timer portion so that the clock will begin operation and will continue operaton for thirteen or fourteen count cycles. The momentary closure of either switch 80 or 90 causes the base of transistor 128 to be driven to saturation thereby maintaining the transistor 124 conductive and locking the loop comprising transistors 124, 123 and 128 on, so that a positive voltage will be maintained at the emitter of transistor 123. The Zener diode 130 maintains the base of transistor 123 at 6.2 volts with the source 119 of 12 volts. This means that the voltage at the emitter of transistor 123 will be about 5.5 volts. The latter voltage on bus 122 is effective to maintain the transistor 128 in a high current state so that upon opening of the switch 80 or 90, the system will be maintained locked on. It will stay locked on until the transistor 133 is turned on, shorting the Zener diode 130 to ground. The latter action will remove the voltage from the emitter of transistor 123, thereby turning transistor 128 off and terminating the cycle.

The timer is so arranged that upon conduction in transistor 124, capacitor 135 applies a voltage to the base of transistor 138 which immediately discharges capacitor 140 through the collector-emitter path. Capacitor 140 then begins to regain charge by way of resistor 139. Resistor 139 and capacitor 140 thus control the time cycle. The voltage across capacitor 140 is applied by way of a level detector 141, 142 to the base of transistor 143. The level detector 141, 142 is a modified Schmidt trigger circuit which operates such that, after a given predetermined time interval, the transistor 133 will short circuit the Zener diode 130.

The operation of the transistor 138 is such that it is immediately saturated upon conduction in transistor 124 so that condenser 140 will discharge. This makes certain that the timing circuit will start off at exactly the same point each time conduction is initiated in transistor 124. The capacitor 135 charges to turn off the transistor 138. Thus, capacitor 135 and resistor 136 form a timing network which controls the conduction cycle of transistor 138 permitting conduction in transistor 138 for a very short interval.

Transistor 160 is connected at its base through resistor 161 to the junction between capacitor 135 and resistor 136. The emitter transistor 160 is connected to ground. The collector is connected by way of resistor 162 to bus 122. Conduction in transistor 160 serves to ground the B+ on the clock bus 122 at the beginning of each sequence. The terminal 110 is also shown in FIG. 3, and serves to apply a ground state to the connector to reset the flip-flop therein to the same state as the beginning of each count sequence.

The emitter of transistor 123 is connected to SCR units 166 and 167 and to the output terminal 114. The outputs of the SCR unit 166 is connected to terminal 115. The output of SCR unit 167 is connected to terminal 160.

Switches 80 and 90 are connected in the trigger circuits of the SCR units 167 and 166, respectively. The closure of switches 80 and 90 results in applying and maintaining a positive potential on terminals 116 and 115, respectively, for operation of the ID gate 91 and the call gate 83.

FIGURE 6

The counter 82 is shown in detail in FIG. 6. It comprises four flip-flops 170–173, connected in tandem with the clock terminal 111 being connected to the input of the first flip-flop 170. The set terminal 110 is connected to the reset terminal of all four of the flip-flops 170–173.

The eight outputs from the flip-flops are connected by way of lines 181–188 to the inputs to twelve gates 191–202 having output lines 211–221 for an eleven count output. The twelfth count line 112 extends from the last gate 202. The lines 181–188 are connected to the gates 191–202, the latter being of the type which involve four gate inputs. The table for the interconnections is as follows:

TABLE VI

| | 170 | 171 | 172 | 173 |
|---|---|---|---|---|
| Set | 1 | 1 | 1 | 0 |
| 1 | 0 | 1 | 0 | 1 |
| 2 | 1 | 1 | 0 | 0 |
| 3 | 0 | 0 | 1 | 0 |
| 4 | 1 | 0 | 1 | 0 |
| 5 | 0 | 1 | 1 | 0 |
| 6 | 1 | 1 | 1 | 0 |
| 7 | 0 | 0 | 0 | 1 |
| 8 | 1 | 0 | 0 | 1 |
| 9 | 0 | 1 | 0 | 1 |
| 10 | 1 | 1 | 0 | 1 |
| 11 | 0 | 0 | 1 | 1 |
| 12 | 1 | 0 | 1 | 1 |

It will be noted that the expander clock terminal 113 is connected by diode 230 to gate 202. The expander clock terminal 113 is similarly connected to each of the remainder of the gates 195–201. The other four gates 191–194 are connected by way of diodes to the expander terminal 233. Terminal 233 is connected to a switch 234 which serves to connect terminal 233 to terminal 113 in one position. In the other position, switch 234 connects terminal 233 to ground, shorting out or eliminating the first four counts from the counter. Switch 234 is also shown on FIG. 3 and provides for selecting operation on a 7-count or an 11-count as may be desired. For a 7-count cycle, the switch 234 would be connected to ground as shown. For an 11-count cycle, the switch would be connected to terminal 113. It will be recognized that a 7-count call sequence would be adequate for local dialing purposes whereas an 11-count sequence would be necessary for long-distance dialing.

The twelfth count applied to terminal 112, FIG. 5, shorts transistor 120 which deactivates the clock. Following the twelfth count, the timer, FIG. 5, terminates operation of the control unit 81.

The output signals from the counter 82 of FIGS. 3 and 6 are then applied by way of lines 211–221 to the call code cell 83 and to the ID code cell 91. The call code cell 83 is provided with eleven pairs of lateral lines, one pair connected to each of the output lines 211–221. For example, line 211 is connected to lines **211*a* and 211*b* by way of diodes 211*c* and 211*d*, respectively. Line 212 is connected to lines 212*a* and 212*b*. The remainder of the lines are similarly connected, the last line 221 being connected to lines 221*a* and 221*b***.

The call code cell 83 further includes seven longitudinal lines A1–A4, B1–B3 which lead to a gate unit 240. In a similar manner, the lines 211–221 are connected by way of pairs of diodes to pairs of lateral lines extending across the cell 91. Cell 91 has eight longitudinal lines A0–A4, B1–B3. The lateral and longitudinal lines on cells 83 and 91 may be selectively interconnected to form any desired sequences of pairs of tones. For example, on call cell 83 line 211 is connected to cause production of tones A1 and B1. Line 212 is connected to cause production of tones A1 and B2. By this means any seven digit member or eleven digit number may be coded in each of the cells 83 and 91. The longitudinal lines on cell 91 also lead to gate 240. Line 116 is connected by way of resistors 241 to seven buses on gate 240, each of which is connected to one of the lines A1–A4, B1–B3, from cell 83. The connections are at points between the resistors 241 and diodes 242. Thus, when a call sequence is to be carried out, a voltage is maintained on line 116, enabling the signals from the call cell to pass through the gate 240.

The line 115 is connected to the seven buses on gate 240 by way of resistors 243. The seven lines A1–A4 and B1–B3 from cell 91 are connected to the bus lines on gate 240 at points located between resistors 243 and diodes 244. Diodes 244 are poled opposite the diodes 242.

Line A0 of cell 91 is connected directly through the gate unit 240 to a relay driver circuit 245, the output of which is connected to the first coil in bank 67. The seven buses in the gate unit 240 are connected by way of a circuit identical to the driver circuit 245 to seven of the coils in bank 67, i.e. the coils for tones A1, A2, A3, A4, B1, B2 and B3.

All of the driver circuits have not been shown in detail since they are identical with circuit 245 which is a simple two transistor, direct coupled amplifier.

It will be noted that eight output lines from the card reader 70 are connected to the lines leading to eight of the top ten coils in bank 67, i.e. A1–A4 and B1–B4.

It will be further noted that lines leading from the external keyboard 93 are provided for connecting to all of the coils in bank 67.

The first coil in bank 67 is shunted by a diode 250 to suppress any voltage spikes that develop upon interruption of current flow through the first coil. A diode (not shown) is provided for each of the other coils in bank 67.

The relay drive circuit 245, when energized, essentially connects to ground the A0 line so that current may flow from the power supply line 251 through resistor 252 through the top coil in bank 67. It will be noted that resistor 252 is connected at its lower end, by way of channel 253, to a squelch terminal on amplifier 50 so that the amplifier 50 will have decreased gain when two or more of the coils in bank 67 is energized.

The common terminal to the bank of relays 64 is connected by way of line 260 to the common input terminal of oscillator A. Five lines 261 connect the top five relays to terminals A0–A4 on oscillator 61. Line 262 connects the common terminal of relays in bank 65 to the common input terminal of oscillator 62. Lines 263 connect the relays of bank 65 to terminals B0–B4 of oscillator 62.

The line 264 is connected to the common input terminal of oscillator 63. Lines 265 connect the relays in bank 66 to the input terminals C0–C3 of oscillator 63. The outputs of the oscillators 61, 62 and 63 are all summed on line 68.

It will be of particular significance to note that the call cell 83 and the ID code cell 91 are plug-in units being provided with plugs 270 and 271, respectively. In a preferred embodiment of the invention, the call code cell 83 and the ID code cell 91 will be tailored for a particular terminal location. The ID code cell is of character such that for a given destination, not only will the longitudinal lines A1–A4 and B1–B3 be selectively interconnected with the lateral line to give pairs of tones on each of the seven or eleven steps effective in the dialing sequence, but also there will be a unique tone involved in the combination by reason of connections made between the longitudinal lines A0 on cell 91 and selected ones of the lateral lines. By this means, a particular and unique code can be set in the ID code cell 91 so that a given computer account, for example, can be accessed only after proper identification through the use of the combinations of circuits energized through the lines A1–A4, B1–B3, along with A0. It will be noted that the external keyboard 93 has provision for energizing the A0 tone, but that the keyboard 28 does not have such capability nor does the card reader 70. Thus, by the arrangement above described, access is dependent upon satisfying unique code requirements. Such code requirements will be satisfied only by a selected sequence dictated by the connections on the ID code cell 91 or by manually introducing such a sequence through the external keyboard 93.

In practice, the ID code cell 91 as well as the call code 83 could be generally accessible to an operator and could be replaced through use of the plugs 271 and 270, respectively, by the operator. If desirable, access to such cells could be limited by suitable security lock or other security arrangements. For a permanent terminal installation, the ID code cell could be potted into the system, eliminating any possibility of change at any time. However, in the preferred aspect, the ID code cell is a plug-in type unit having at least one tone channel that is inaccessible through the keyboard associated with such terminal.

The system is supplied with power at terminal 251 from an AC source through line 300, power supply 301 and switch 302. A battery 303 may be employed through switch 304. An AC–DC selector switch 305 provides for such selection. Rectifying means 306 provide for charging battery 303.

The recorder 96 is also powered from the same source, though the supply lines are not shown.

The recorder, normally on standby, will respond to application of a voltage on line 310 to lock the recorder into the record mode by a suitable latching relay, not shown. The recorder will remain latched in the record mode until unlatched. This will permit recordal of a call sequence initiated by closure of switch 80. The recorder 96 will continue to record a subsequent ID code sequence initiated by closure of switch 90. Coded data sequences produced by actuation of keys on keyboard will also be recorded. An entire tape, for example, may be filled over an extended time period. When desired, the data thus stored may be played back via line 100 and switch 99 to transmit in a short playback interval all the data thus stored.

In one embodiment of the system, the following parameters and conditions were employed:

The clock (FIG. 5) had a period of about 100 milliseconds.

The timer and associated circuits included:

Capacitor 140—47 microfarads
Resistor 139—820K ohms
Capacitor 135—5 microfarads
Resistor 136—47000 ohms
Transistors 128, 138, 141 and 142—2N3711
Transistor 123 and 133—2N3704
Transistor 124—2N3703
SCR 166 and 167—TIC44
Diode 130—IN753
Battery 119—12 volts In the counter:

Units 170, 171, 172 and 173 were integrated circuits MC853P manufactured and sold by Motorola.

Units 191–202 were integrated circuits MC844P by Motorola.

The relays 64–66 were reed relays of the type manufactured and sold by Elec-Trol, Inc., 21018 Soledad Rd., Saugus, Calif. 91350 Model No. R2155–2 or RA–30011121.

FIGURE 7

In the foregoing description in connection with the operation of the switch 234 the counter would be caused to operate either at 8 or 12 counts depending upon whether local or long distance dialing is desired. In a preferred embodiment of the invention it is desirable to operate the identification sequence from code cell 91 without change, when switching from local to long distance dialing. More particularly in FIG. 6, with the switch 234 in the position indicated, the top four stages of the counter 191–194 are grounded and inoperative so that only the last eight stages 195–202 operate. In such cases, both the dial sequence and the identification sequence of tones would be limited to seven tones.

In FIG. 7 a modification has been shown which represents a preferred mode of operation. It assures that, for local dialing, the identification sequence is the same as on the long distance dialing, more particularly, a dialing sequence of seven tones will be followed by an eleven tone identification sequence. This is accomplished in FIG. 7 where switch 234 has been shown in the same position as in FIG. 6. However, the terminal which the switch contacts is open. The circuit includes a transistor 350 having its collector-emitter terminals connected in parallel with switch 234. The base is connected by way of resistor 351 to the 12 volt supply and to the collector of a second transistor 352 whose emitter is grounded and whose base is connected by way of resistor 353 to the 12 volt supply. The base of transistor 352 is connected to the collector of transistor 354 whose emitter is grounded and whose base is connected by way of resistor 355 to line 115. Line 115 corresponds with line 115 of FIG. 3 and is the B+ bus for the ID portion of gate 240.

A transistor 360 is connected at its collector to the collector of transistor 350. The emitter of transistor 360 is grounded and its base is connected by way of resistor 361 and switch **234*a* to line 114. Line 114 is the B+ bus for the call code portion of gate 240, FIG. 3. Switches 234 and 234*a* are mechanically coupled as indicated by dotted line 234*b*. The second terminal of switch 234*a*** is connected to ground.

In operation when the ID button 90, FIG. 3, is actuated the voltage on line 115, FIG. 7, causes transistor 350 to conduct, effectively shorting switch 234. Thus, when in the local position, it does not matter that switch 234 leads to an open circuit. The ID sequence will always be 11 tones. The actuation of the call button 80 will cause transistor 360 to conduct thus shorting switch 234 so that in the call mode only seven tones will be generated. This is because transistor 360 effectively grounds or disables the top four channels of the counter. Thus by this means, in the local mode, only seven tones will be generated for the call sequence while maintaining eleven tones for the ID sequence. In the long distance mode, eleven tones will be generated on both the call and ID sequence.

FIGURES 8–11

In FIGS. 8–11, a suitable construction for the ID code cell 91 is shown. The cell is based upon the provision of a matrix of conductors on a card 380. A plug 271 extends along the upper edge 381 of the card and has two rows of female contacts, an input set 271*a* and an output set 271*b*. On the face shown in FIG. 8 there are 22 transverse conductors 382. The conductors 382 are each connected by way of a diode such as diode 383 to one of the contacts in a set of contacts 384, which in turn are connected to the plug terminals 271*b*. Only one diode, the diode 383, has been shown in FIG. 9, it being understood that 21 like diodes will be mounted on the card 380 to complete the connections indicated in FIG. 3.

Figures 8, 9, 10, 11:
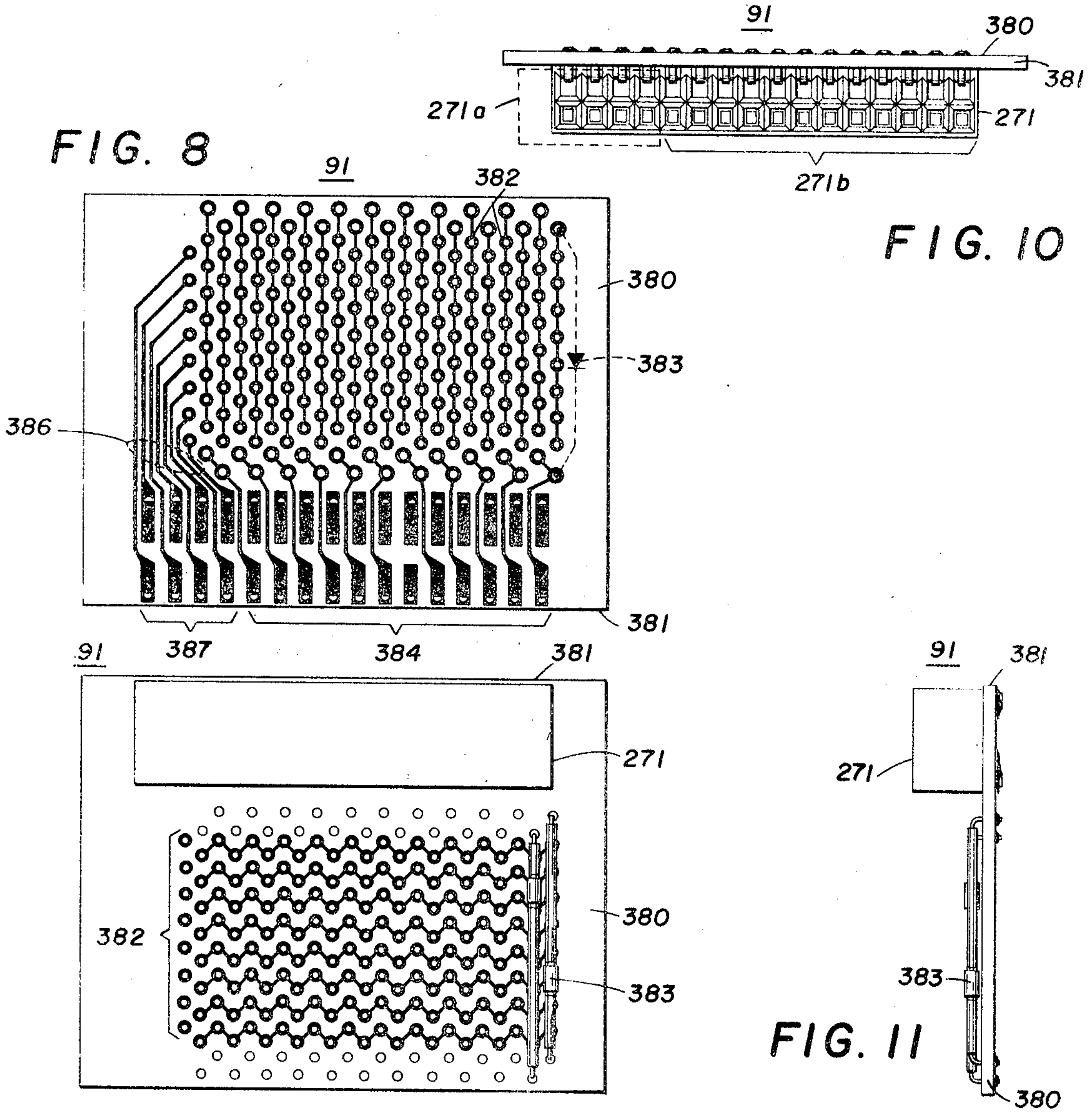

Eight (8) longitudinal lines 382 are connected by way of strips 386 to the set of output terminals 387 which in turn are connected to the plug terminals 271*a*. The eight (8) longitudinal lines 382 are located on the opposite face of card 380 as shown in FIG. 9.

The intersection of each of the lateral lines 283 and longitudinal lines 383 is a hole which extends through the card 380. Any card may thus be conveniently coded by the insertion of a conductive member through the hole and electrically bonding the same to the strips on the opposing sides of the card 380 common to the selected hole. Diodes such as diode 383 are mounted on the face card 380, viewed in FIG. 9, and shown in the side view of FIG. 11.

Having described the invention in connection with certain specific embodiments thereof, it is to be understood that further modifications may now suggest themselves to those skilled in the art and it is intended to cover such modifications as fall within the scope of the appended claims.

What is claimed is:

1. A transportable device to permit communicating tone-intelligence between two points using conventional telephone and the telephone system as the transmission medium comprising:

(a) a casing having first and second depressions for respectively receiving the mouthpiece and the earphone of a telephone handset, (b) means within said casing for producing tone frequencies including identification means to direct production of a signal sequence in response to the actuation thereof, (c) speaker means for transmitting said tones through said first depression to said mouthpiece, and (d) switch means on said housing for actuating said identification means.

2. The invention of claim 1 wherein a speaker is located in said casing and connected to reproduce currents in said earpiece through said speaker.

3. A portable terminal for communicating tone-intelligence between two points using conventional telephones and the telephone system as the transmission medium comprising:

(a) a casing having first and second depressions for respectively receiving the mouthpiece and the earphone of a telephone handset, (b) a data keyboard mounted on said casing and having a plurality of selector buttons therein, tone generators for producing plural sets of tone frequencies in response to the movement of each of said buttons, speaker means for transmitting said tones through said first depression to said mouthpiece, whereby said tones are transmitted to a reception station in said telephone system, and (c) control means in said terminal for generating a tone frequency sequence which includes at least one tone-frequency signal in addition to any tone produced by actuation of any key on said data keyboard.

4. A transportable device to permit communicating tone-intelligence between two points using conventional telephone gear and the telephone system as the transmission medium comprising:

a casing, a cradle surface of said casing having first and second depressions for respectively receiving the mouthpiece and the earphone of a telephone handset, means within said casing for producing tone frequencies in response to the selective actuation thereof, means for generating identification signals uniquely identifying said transportable device and switch means on said casing for actuating said means, and speaker means for transmitting said tone frequencies and said identification signals through said first depression to said mouthpiece, whereby said frequencies and signals are transmitted to a reception station in said telephone system.

5. The device of claim 4 wherein said first and second depressions are located on an upper portion of said casing such that said telephone handset may rest upon said depressions, and wherein an array of manually operable keys are set in the upper part of said casing for actuating said means within said casing for producing tone frequencies.

6. A transportable device to permit communicating tone-intelligence between two points using conventional telephone and the telephone system as the transmission medium comprising:

(a) a casing having first and second transducer means for respectively receiving the mouthpiece and the earphone of a telephone handset, (b) control means within said casing for energizing one of said transducer means for audible tone frequencies, said control means including identification means to direct production of a unique signal sequence in response to the actuation thereof, and (c) switch means on said housing for actuating said identification means.

7. A portable unit for communicating tone intelligence utilizing conventional telephone channels and handsets which comprises:

a casing having an upper surface extending from a front portion normally facing an operator, a pair of electromechanical transducer means mounted on said upper surface for communication therethrough at spaced locations corresponding with the spacing of the earpieces and mouthpiece on said handset and located on said upper surface remote from said front portion, means within said casing for generating energizing signals for one of said transducer means and for detecting audible signals received from the other of said transducer means, and an array of manually operable keys set in said upper surface between said transducer means and said front portion for convenient access by said operator and adapted to select and control the generation of said signals.

References Cited

UNITED STATES PATENTS

| | | |
|---|---|---|
| 2,154,441 | 4/1939 | D'Humy et al. |
| 2,176,065 | 10/1939 | D'Humy et al. |
| 2,186,895 | 1/1940 | D'Humy et al. |
| 2,186,896 | 1/1940 | D'Humy et al. |
| 2,186,897 | 1/1940 | D'Humy et al. |
| 2,186,898 | 1/1940 | D'Humy et al. |
| 2,209,326 | 7/1940 | D'Humy et al. |
| 2,193,875 | 3/1940 | Lindenblad. |
| 2,815,400 | 12/1957 | Poylo. |
| 2,957,952 | 10/1960 | Jaeger. |

(Other references on following page)

| | | |
|---|---|---|
| 3,131,259 | 4/1964 | Di Iorio et al. |
| 3,187,107 | 6/1965 | Knight et al. |
| 3,225,334 | 12/1965 | Fields et al. |
| 3,229,036 | 1/1966 | Hillyer. |
| 3,240,427 | 3/1966 | Holman. |
| 3,242,480 | 3/1966 | Walker et al. |
| 3,277,243 | 10/1966 | Fairbairn. |
| 3,301,967 | 1/1967 | Plyer. |
| 3,305,635 | 2/1967 | Kadis. |
| 3,315,039 | 4/1967 | Gebhardt et al. |
| 3,347,988 | 10/1967 | Marill et al. |
| 3,371,162 | 2/1968 | Scantlin. |
| 3,375,500 | 3/1968 | Fowler et al. |
| 3,381,276 | 4/1968 | James. |
| 3,384,713 | 5/1968 | Duncan. |
| 3,395,245 | 7/1968 | Harris. |
| 3,399,385 | 8/1968 | Gorman et al. |
| 3,400,378 | 9/1968 | Smith et al. |
| 3,403,225 | 9/1968 | Mislan et al. |
| 3,407,387 | 10/1968 | Looschen et al. |
| 3,413,423 | 11/1968 | Stevko. |
| 3,415,947 | 12/1968 | Abbey et al. |

RALPH D. BLAKESLEE, Primary Examiner

U.S. Cl. X.R.

179—1, 84, 90

UNITED STATES PATENT OFFICE
CERTIFICATE OF CORRECTION

Patent No. 3,515,806 June 2, 1970

Earl D. Spraker

It is certified that error appears in the above identified patent and that said Letters Patent are hereby corrected as shown below:

Column 4, line 75, "combinatitons" should read -- combination --. Column 7, Table VI, the first two figures under "173" should read -- 1 -- and -- 0 --. Column 8, line 30, "member" should read -- number --. Column 12, after line 69 insert -- 2,186,899 1/1940 D'Humy et al. --.

Signed and sealed this 23rd day of February 1971.

(SEAL)
Attest:

EDWARD M. FLETCHER, JR.
Attesting Officer

WILLIAM E. SCHUYLER, JR.
Commissioner of Patents